(12) United States Patent
Ferber

(10) Patent No.: US 8,547,792 B2
(45) Date of Patent: Oct. 1, 2013

(54) PROCESSING SEISMIC DATA

(75) Inventor: Ralf Ferber, Horsham (GB)

(73) Assignee: WesternGeco L.L.C., Houston, TX (US)

( * ) Notice: Subject to any disclaimer, the term of this patent is extended or adjusted under 35 U.S.C. 154(b) by 578 days.

(21) Appl. No.: 11/791,802

(22) PCT Filed: Dec. 1, 2005

(86) PCT No.: PCT/GB2005/004600
§ 371 (c)(1),
(2), (4) Date: Jan. 11, 2008

(87) PCT Pub. No.: WO2006/059107
PCT Pub. Date: Jun. 8, 2006

(65) Prior Publication Data
US 2008/0304359 A1    Dec. 11, 2008

(30) Foreign Application Priority Data
Dec. 1, 2004  (GB) .................................. 0426323.2

(51) Int. Cl.
*G01V 1/00*    (2006.01)
(52) U.S. Cl.
USPC .......................................................... 367/52
(58) Field of Classification Search
USPC ................ 367/37, 38, 50–52, 55, 62; 702/17
See application file for complete search history.

(56) References Cited

U.S. PATENT DOCUMENTS

| 3,274,541 | A | | 9/1966 | Embree | |
|---|---|---|---|---|---|
| 3,371,310 | A | * | 2/1968 | Silverman | 367/57 |
| 3,622,967 | A | * | 11/1971 | Foster et al. | 367/62 |
| RE31,509 | E | * | 1/1984 | Neidell | 342/108 |
| 4,608,673 | A | | 8/1986 | Lazear | |
| 4,887,243 | A | * | 12/1989 | Pann | 367/24 |
| 5,136,550 | A | * | 8/1992 | Chambers | 367/38 |
| 5,396,472 | A | | 3/1995 | Paffenholz | |
| 5,524,100 | A | | 6/1996 | Paffenholz | |
| 5,991,238 | A | | 11/1999 | Barr | |
| 6,510,105 | B1 | * | 1/2003 | Ten Kroode et al. | 367/68 |
| 7,222,023 | B2 | * | 5/2007 | Laurent et al. | 702/18 |
| 7,505,360 | B2 | * | 3/2009 | Bisley et al. | 367/24 |

FOREIGN PATENT DOCUMENTS

| GB | 1400044 | 7/1975 |
|---|---|---|
| GB | 1447873 | 9/1976 |
| WO | 03023450 A1 | 3/2003 |
| WO | 2004020972 A3 | 3/2004 |

* cited by examiner

Primary Examiner — Krystine Breier

(57) ABSTRACT

A method of processing seismic data including convolving at least first and second seismic data traces or respective portions of at least first and second seismic data traces to form a composite trace. The travel time of an event may then be determined in the composite trace. This provides an improved method compared to the prior art technique of picking the travel time of an event individually in each one of a number of seismic data traces and averaging the individual picked travel times.

9 Claims, 6 Drawing Sheets

PROCESSING SEISMIC DATA

CROSS-REFERENCE TO RELATED APPLICATIONS

This application claims the benefits of priority from:
i) Application Number 0426323.2, entitled "PROCESSING SEISMIC DATA," filed in the United Kingdom on Dec. 1, 2004; and
ii) Application Number PCT/GB2005/004600, entitled "PROCESSING SEISMIC DATA," filed under the PCT on Dec. 1, 2005;

All of which are commonly assigned to assignee of the present invention and hereby incorporated by reference in their entirety.

This invention relates to the processing of seismic data. It particularly relates to a process for processing a number of seismic data traces to provide a composite data trace. The invention may be used to for example, attenuate random noise and interference in the original data traces so as to provide better-quality images of the earth's interior.

BACKGROUND

In seismic surveys, a seismic source is actuated to induce seismic waves at or near the surface of the earth. Explosive sources, vibrating devices and airguns are examples of seismic sources. The seismic waves propagate into and through the earth and are reflected, refracted, and diffracted by geological formations within the earth. Some seismic waves are directed back to the earth's surface, and can be detected by a plurality of seismic receivers (or seismic sensors), such as geophones or hydrophones, deployed at the earth's surface. Each such receiver monitors and records the seismic wavefield at the receiver's location. Typically a receiver monitors the seismic wavefield for a given period after actuation of a seismic source. The data received and recorded by a receiver are in the form of a record of the variation over time of one or more components of the seismic wavefield (such as, for example, the pressure or a component of the particle velocity), and are collectively called a trace. The collection of traces is stored for further processing in known ways to obtain information about the earth's subsurface. Such information is commonly interpreted by geophysicists to detect the possible presence of hydrocarbons, or to monitor changes in hydrocarbon bearing rocks in the subsurface.

FIG. 1 is a schematic illustration of a seismic surveying arrangement that includes a seismic source 1 and five seismic receivers 2-6 spaced from the source 1. FIG. 1 shows a land-based seismic survey in which the seismic source 1 and the seismic receivers 2-6 are provided at the earth's surface. When the seismic source 1 is actuated to emit seismic energy, some of the emitted seismic energy is detected by the seismic receivers 2-6. The receivers measure a component of the seismic wavefield, and provide a data trace showing how that component varies with time.

FIG. 2 is a schematic illustration of traces acquired by the receivers 2-6 of FIG. 1 when the seismic source 1 is actuated to emit seismic energy. Trace X2 is the trace acquired by receiver 2 and so on. (Most seismic receivers in use today are digital receivers that repeatedly sample the seismic wavefield and so output a series of discrete values rather than a continuous trace, but the traces are represented as continuous traces in FIG. 2 for simplicity.) The horizontal axis in FIG. 2 represents the time after actuation of the seismic source 1, and the vertical axis of FIG. 2 represents the offset of the trace (the "offset of a trace is the horizontal distance between the source and the receiver used to acquire the trace). The traces X2 to X6 are arranged in order of increasing offset. Within a trace, the horizontal axis represents the amplitude of the component of the seismic wavefield measured by the receiver, as a function of time.

The traces X2 to X6 represent a "common source gather" of traces. Each trace was acquired following actuation of the source 1.

Each trace X2-X6 contains a number of seismic "events". Event 7 is the "direct event" and represents the arrival at the receiver of seismic energy that has travelled direct from the source 1 to the receiver 2-6 along the path 8 shown in FIG. 1. Event 9 is a "reflection event", and represents the arrival at the receiver of seismic energy that was transmitted into the earth's interior and has travelled to the receiver 2-6 along a path such as the path 11 shown in FIG. 1, which involves a reflection at a geological structure 10 within the earth that acts as a partial reflector of seismic energy. The time at which an event occurs in a trace is known as the "arrival time" or the "travel time" of the event, and is equal to the time taken for seismic energy to travel from the source to the receiver via the respective path.

Each of the traces X2 to X6 in FIG. 2 contains a direct event 7 and the reflection event 9. However, the events do not occur at the same times in each trace, because the length of the path of seismic energy from the source to the receiver varies from one trace to another. In the case of the direct event 7, the length of the path of seismic energy from the source to the receiver is equal to the distance from the source to the receiver (i.e. is equal to the offset). The travel time of the direct event therefore varies linearly with offset. In the case of the reflection event 9, however, the relationship between offset and the travel time is not linear—if the velocity of propagation of seismic energy is assumed to be constant and isotropic within the earth then the travel time of the reflection event will, as is well known, show a hyperbolic dependence on offset.

Seismic data in general contains noise signals, which may be coherent or incoherent, as well as the desired seismic reflection signals. These noise signals, hereafter referred as just "noise", interfere with the interpretation of the seismic signals, and degrade the quality of the subsurface images that can be obtained by processing the recorded seismic data. Travel time readings taken from seismic data traces can also be degraded by travel time fluctuations between traces (known as "time-jitter"). If the traces X2 to X6 of FIG. 2 contain significant random noise and/or time-jitter it would be difficult to make an accurate determination of the travel time of the reflection event 9 occurs. It is therefore very desirable to suppress or attenuate noise and time-jitter that is present in recorded seismic data traces before processing the data to obtain an image of the earth's interior.

One method of attenuating incoherent noise (noise that varies randomly from one trace to another) or time-jitter is to make use of traces in a gather that are adjacent to the trace being processed. For example, if seismic receivers in a seismic survey are deployed close to one another it is likely that the seismic wavefield sampled by a receiver will not be significantly different from the seismic wavefield sampled by an adjacent receiver. However, the incoherent noise or time-jitter will vary randomly from one trace to another. Thus, if adjacent traces are combined the noise and time-jitter in one trace should cancel the noise and time-jitter in another trace (if the noise and time-jitter are random).

In the example of FIG. 2, one method to improve the accuracy of the determination of the travel time of the reflection event 9 in trace X4 would be to make use of the adjacent traces on either side or even of the adjacent two traces on either side. By determining a composite travel time t' according to:

$$t' = t_3 + t_4 + t_5 \quad (1)$$

(where $t_k$ denotes the travel time of the reflection event 9 in the $k^{th}$ trace) or according to:

$$t' = t_2 + t_3 + t_4 + t_5 + t_6 \quad (2)$$

and subsequently dividing the composite time t' by the number of traces used in its determination, the effect of random noise on the measured travel time of the reflection event in the trace X4 should be reduced.

As explained above, the travel time of a seismic event varies from one trace to another, and in the case of a reflection event varies non-linearly with offset. It is therefore not possible simply to sum traces acquired at different offsets together. The conventional procedure is therefore to pick the travel time of the event in each data trace, correct the picked travel times for changes in offset, and add the corrected travel times together. This process can be time-consuming. Furthermore, inaccuracy in picking the travel times in the data traces can lead to inaccuracy in the final result.

There are other occasions where it is desired to sum travel times of events in more than one seismic trace. For example, a linear trend removal filter generates a composite travel time according to:

$$t' = -\tfrac{1}{2} t_{k-1} + t_k - \tfrac{1}{2} t_{k+1}$$

Again, a linear trend filter is conventionally implemented by picking the individual travel times in individual traces, and summing the picked travel times.

SUMMARY OF THE INVENTION

The present invention provides a method of processing seismic data comprising convolving at least first and second seismic data traces or respective portions of at least first and second seismic data traces thereby to form a composite trace; and determining the travel time of an event in the composite trace. The method eliminates the need to pick travel times in each individual data trace used, and only requires one picking operation. Furthermore, since random noise is attenuated in the convolution step, picking the travel time of an event in the composite trace should provide a more accurate result.

In principle, the method may be effected by convolving complete data traces. It may however be computationally more efficient to perform the convolution using selected portions of data traces rather than complete traces. For example, the method may be carried out by defining a time window around an event of interest in the data traces, and performing the convolution using only the portions of data traces in the time window.

The first and second traces may be members of a gather of traces. They may be members of a common source gather, although the invention is not limited to a common source gather. The first and second traces may be adjacent traces in the gather.

The method may comprise convolving a trace with n traces that are adjacent on one side and with m traces that are adjacent on the other side. The number of traces n on one side of the gather used in the convolution need not be equal to the number of traces m on the other side of the gather used in the convolution, although it may be that m=n.

The method may comprise multiplying the time axis of each of the data traces by a respective constant before the step of convolving the traces or the portions of the traces. This allows a composite travel time that involves a weighted summation to be determined by the method of the invention.

The constant for a selected one of the traces may be less than zero, corresponding to a reversal of the time axis. The constant for a selected one of the traces may have a magnitude of less than one, corresponding to a contraction or "squeeze" of the time axis. Alternatively, the constant for a selected one of the traces may have a magnitude greater than one, corresponding to a stretch of the time axis.

The method may comprise determining the composite trace according to $X_k'(t) = *_{j=-m}^{n} X_{k+j}(\alpha_j t)$, where $X_k(t)$ denotes the $k^{th}$ trace, n and m are natural numbers, $a_j$ denotes a constant, * denotes the convolution operation, and $X_k'(t)$ denotes a composite trace.

The convolution may alternatively be performed in the frequency domain.

A second aspect of the invention provides an apparatus for processing seismic data, the apparatus comprising means for convolving at least first and second seismic data traces or respective portions of first and second seismic data traces thereby to form a composite trace; and determining the travel time of an event in the composite trace.

The apparatus may comprise a programmable data processor.

A third aspect of the invention provides a storage medium containing a program for the data processor of an apparatus of the second aspect.

A fourth aspect of the invention provides a storage medium containing a program for controlling a programmable data processor to carry out a method of the first aspect of the invention.

Preferred embodiments of the present invention will now be described by way of illustrative example with reference to the accompanying figures in which:

DETAILED DESCRIPTION

The generation of a composite travel time t' of an event can be expressed generally as:

$$t' = \sum_{j=-m}^{n} a_j t_{k+j} \quad (4)$$

In this summation, t' denotes a composite travel time, $t_j$ denotes the travel time of the event in the $j^{th}$ trace of a gather of seismic data traces, n denotes the number of traces of the gather on one side of the subject trace (the $j^{th}$ trace) that are included in the summation, m denotes the number of traces of the gather on the other side of the subject trace that are included in the summation, and $a_j$ is the weighting coefficient applied to the $j^{th}$ trace.

In the case of the linear trend removal filter given above, for example, n=m=1 so that the $k^{th}$, $(k-1)^{th}$ and $(k+1)^{th}$ traces are included in the summation, with $a_{k-1}=a_{k+1}=-\frac{1}{2}$ and $a_k=1$. No other traces are used in the convolution, so the coefficients for the $(k-2)^{th}$ or lower traces and for the $(k+2)^{th}$ or higher traces are zero (so $a_{k-2}=a_{k-3}=\ldots=0$, $a_{k+2}=a_{k+3}=\ldots=0$). In general, this summation is applied in a rolling manner to a gather, so that the summed travel time is calculated for every trace in the gather—i.e., a travel time sum is calculated for k=2 (from the first, second and third traces), for k=3 (from the second, third and fourth traces) and so on up to k=N−1 (for which the N−2, N−1 and Nth traces are used) where there are N traces in a gather. (If there are fewer than m traces to the left of the subject trace as will be the case for the first trace in the gather, or fewer than n traces to the right of the subject trace as will be the case for the last trace in the gather, the actual number of available traces may be used to create the composite trace to enable a composite trace to be created for each original trace of the gather.)

Figure 1:
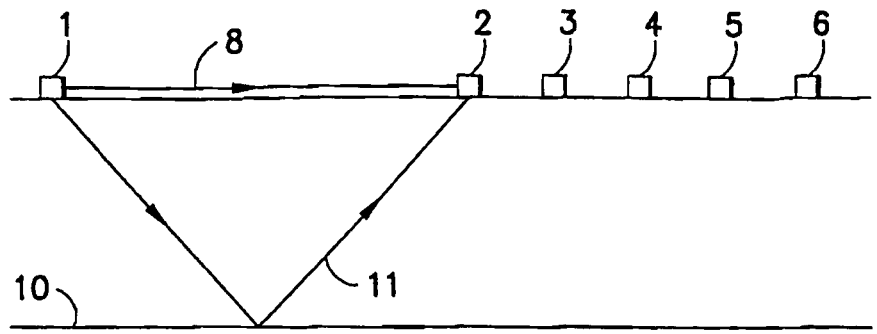
FIG. 1 shows a typical seismic surveying arrangement.
Figure 2:
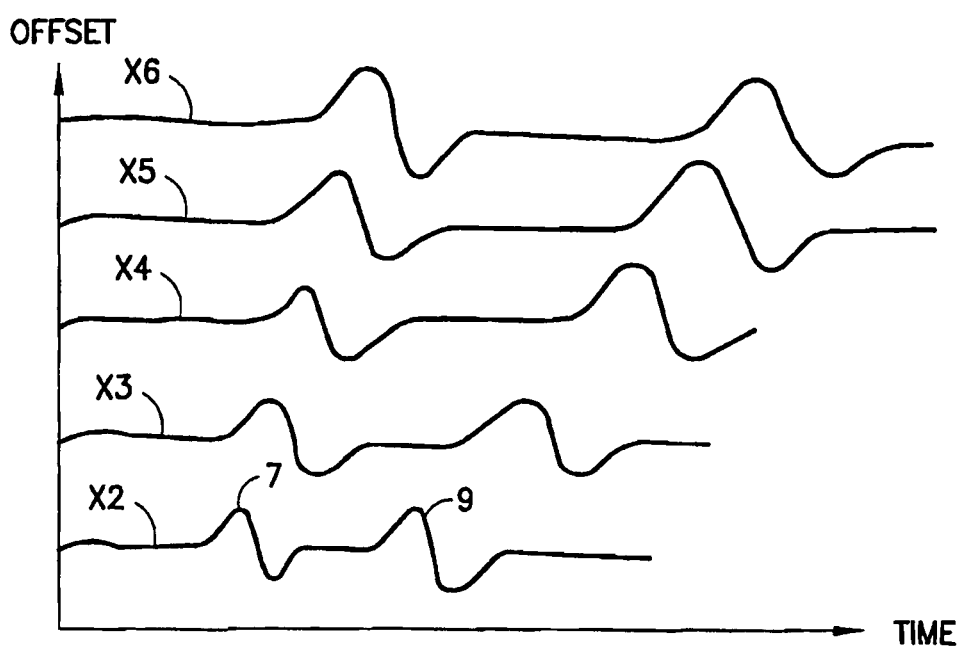
FIG. 2 is a schematic illustration of seismic data traces acquired by the seismic surveying arrangement of FIG. 1.

According to the invention, the summation of picked travel times of equation (4) is replaced by a convolution carried out on the original data traces to obtain a composite trace. In one embodiment, the convolution is of the form:

$$X_k'(t) = *_{j=-m}^{n} X_{k+j}(a_j t) \quad (5)$$

where $X_k(t)$ denotes the $k^{th}$ trace (which is a function of time as shown in FIG. 2), X'(t) denotes the composite trace obtained by the convolution, and * denotes the convolution operation. The remaining terms have the same meaning as in equation (4). Thus, rather than picking travel times of an event in, for example, three adjacent traces of a gather and summing the picked travel times as in the prior art, according to the invention the three adjacent traces of the gather are convolved with one another to produce a composite trace $X'_k(t)$. The travel time of the event is then picked in the composite trace.

Equation (5) shows how the weighting coefficients $a_k$ are taken into account during the convolution. Before the traces are convolved, the time axis of each trace involved in the convolution is multiplied by the weighting coefficient for that trace. Where $a_k \neq 1$, this has the effect of "squeezing" the time axis of the trace (if $|a_k|<1$) or "stretching" the time axis of the trace (if $|a_k|>1$). Where $a_k<0$, this also has the effect of reversing the direction of the time axis.

If the convolution is performed on the entire seismic data traces, the term $X_{k+j}(\alpha_j t)$ in equation (5) would represent a seismic data trace over the complete time range for which the trace was acquired. If however the convolution is performed on portions of the data traces rather than on the complete data traces, the term $X_{k+j}(\alpha_j t)$ in equation (5) would be zero outside a defined time window.

Figure 3:
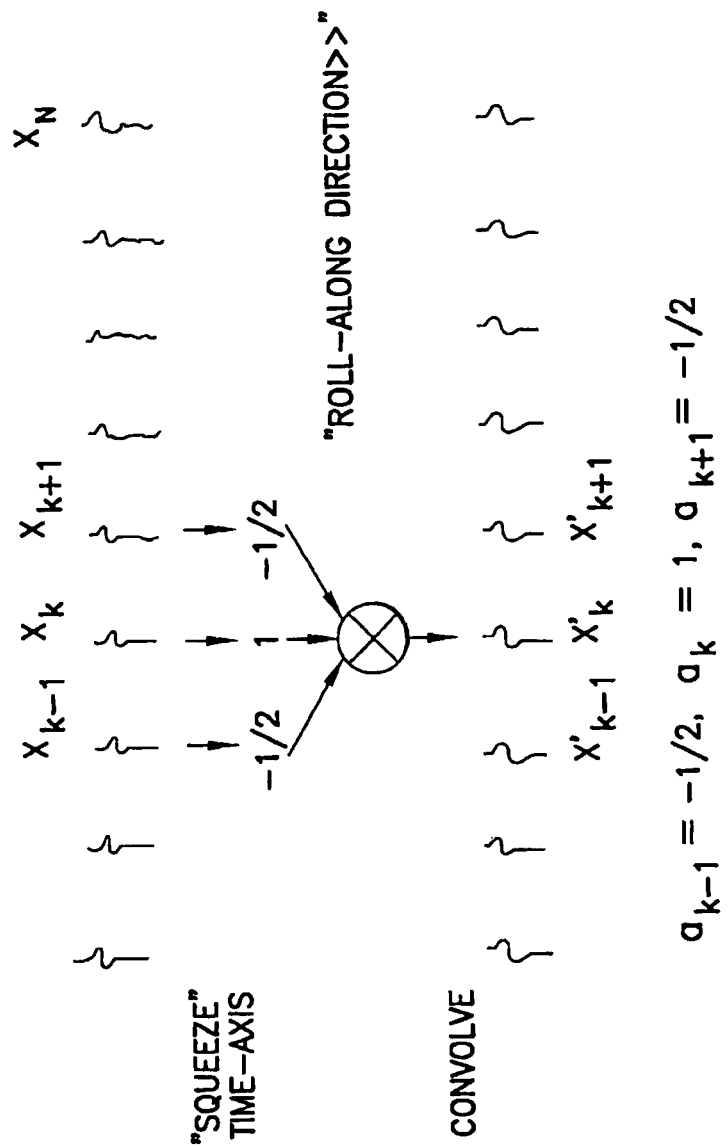
FIG. 3 illustrates a first embodiment of a method of the invention.

FIG. 3 is a schematic illustration of the method of the invention as applied to the linear trend removal filter described above, in which the travel times of an event in the k, k−1 and k+1 traces are included in the summation with $a_{k-1}=a_{k+1}=-\frac{1}{2}$ and $a_k=1$. In the method of the invention the summation is replaced by a convolution of three adjacent traces in the gather. The original data traces $X_k(t)$ are shown at the top of FIG. 3.

FIG. 3 initially indicates the step of adjusting the time axes of the traces involved in the convolution according to the weighting coefficients $a_k$. In the example of the linear trend removal filter with $a_{k-1}=a_{k+1}=-\frac{1}{2}$, the time axes of the $(k-1)^{th}$ and $(k+1)^{th}$ traces are "squeezed" by being multiplied by a factor of ½; the time axes of these are also reversed since the coefficients $a_{k-1}$, $a_{k+1}$ are negative. The time axis of the $k^{th}$ trace is not altered, since the weighting coefficient $a_k=1$. Thus, this step transform $X_{k-1}(t)$ to $X_{k-1}(-\frac{1}{2}t)$, leaves $X_k(t)$ unaltered, and transform $X_{k+1}(t)$ to $X_{k+1}(-\frac{1}{2}t)$.

The convolution operation is represented in FIG. 3 by the ⊗ symbol, and FIG. 3 shows the three adjacent traces of the gather, $X_{k-1}, X_k, X_{k+1}$ being input into the convolution operator, after their time axes have been adjusted as described above, to produce a composite data trace $X'_k(t)$.

Finally, the travel time of the event may be picked in the composite data trace.

In general, where the original data are a gather of seismic data traces it will be required to generate a composite trace corresponding to each of the original data traces. The method illustrated in FIG. 3 is therefore a "rolling" method that is performed for each of the input traces $X_1$ to $X_N$. Thus, the method is performed on $X_1$, $X_2$ and $X_3$ to generate $X_2'$, on $X_2$, $X_3$ and $X_4$ to generate $X_3'$, and so on. (Again, if there are fewer than m traces to the left of the subject trace, or fewer than n traces to the right of the subject trace, the actual number of available traces may be used to create the composite trace so that a composite trace may be created for each original trace.)

The method of equation (5) is performed in the time domain. Most seismic receivers in current use produce a digital output trace consisting of a sequence of values of a seismic wavefield parameter (such as the pressure or a particle velocity component), so that the traces may be processed in the time domain using any suitable computational technique. This is a routine procedure for a skilled worker. However, it can sometimes be more convenient to perform the convolution in the frequency domain, as this can simplify the calculation and so can be more efficient.

If both sides of equation (4) are multiplied by $2\pi i f$, where i denotes the square root of −1 and f is frequency, and the exponential of both sides is taken, this yields $$\exp(2\pi i f t') = \exp\left(\sum_{j=-m}^{n} 2\pi i f a_j t_{k+j}\right) \quad (6)$$

That is to say, a linear combination of travel times in the time domain, as in equation (1) for example, translates into a weighted average of travel times as the argument of the exponential term. The exponential of the summation on the right hand side of equation (6) may be re-written as the product of the exponentials of the individual terms, giving $$\exp(2\pi i f t') = \prod_{j=-m}^{n} \exp(2\pi i f a_j t_{k+j}) \quad (7)$$

Thus, the exponential summation term of equation (6) indicates a simple convolution of data traces as described above with regard to equation (7). Equation (7) is the counterpart in the frequency domain to equation (5) in the time domain, and is one way in which the invention may be carried out in the frequency domain.

Figure 4:
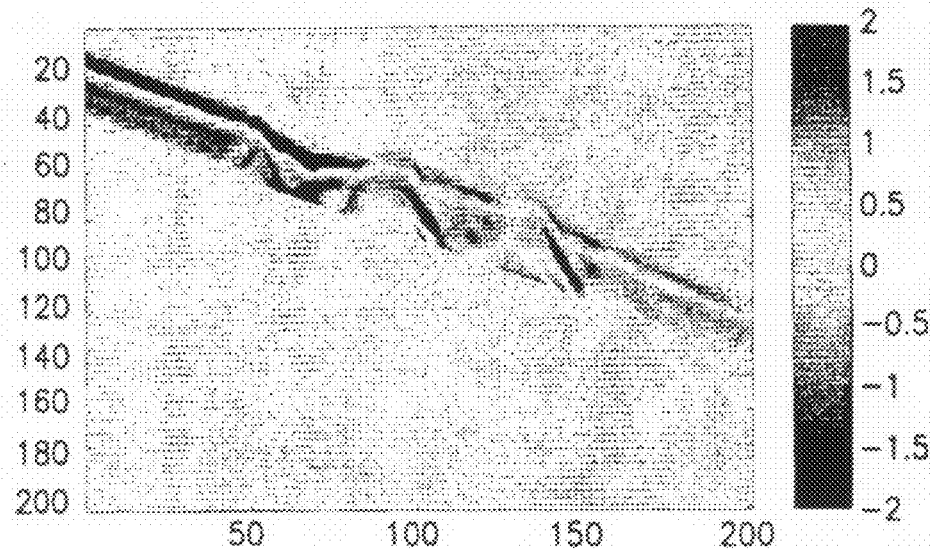
FIG. 4 shows a set of synthetic seismic data traces.
Figure 5:
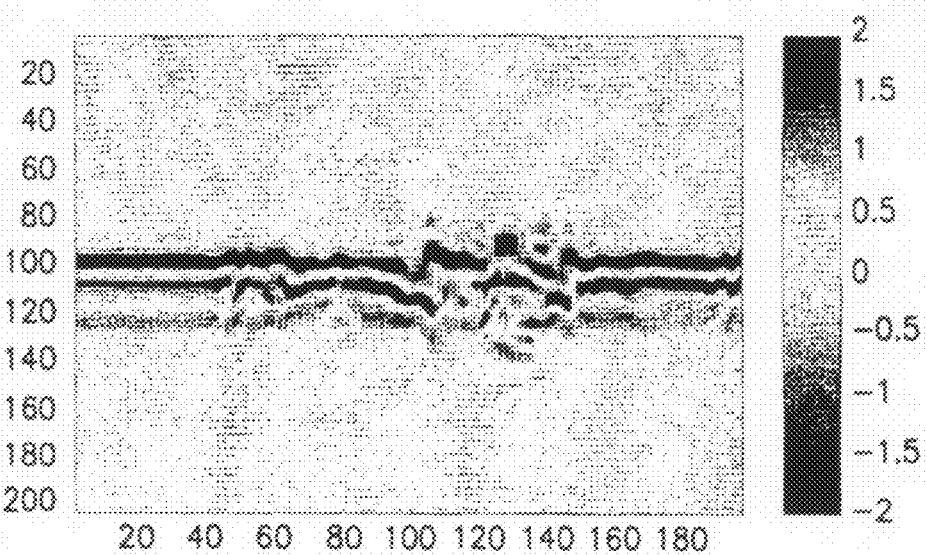
FIG. 5 shows the data traces of FIG. 4 after processing by the first embodiment of the invention.

FIGS. 4 and 5 illustrate results obtained by the invention. FIG. 4 illustrate synthetic seismic data traces simulated for a seismic surveying arrangement containing one seismic source and a large number of seismic receivers. The data were simulated for receivers arranged in a linear array with a constant spacing between each two neighbouring receivers, for a typical earth model. The amplitude of the data traces is proportional to the velocity of particle motion at the receiver location. Each trace in FIG. 4 was simulated for a different receiver, as a consequence of actuation of seismic energy by the seismic source, so that the traces form a common source gather and also form a "shot record" (a gather of all traces for an individual shot). The vertical axis in FIG. 4 represents the time after actuation of the seismic source; the vertical axis is labelled with the number of the time sample, with each two adjacent time samples being 2 ms apart. Thus, the label "200" on the vertical axis in FIG. 4 represents 200 time samples (i.e., 400 ms) after the actuation of the seismic source. The horizontal axis of FIG. 4 represents the offset of the trace, and is labelled with the index numbers of the traces. The traces are arranged in order of increasing offset. The first event occurring in the traces is the direct event, and it can be seen that the arrival time of the direct events increases generally linearly with offset, and show a good linear behaviour for traces up to approximately trace No. 55. The arrival time of the direct event becomes less linear at around trace 55 owing to variations in the subsurface velocity and owing to near-surface discontinuities. Later arrivals than the first arrival have been muted out of the simulated data traces.

The amplitude of the vertical component of the particle velocity simulated for each trace is represented by shading, against a background corresponding to zero amplitude. The scale at the right of FIG. 4 represents the amplitude of the simulated vertical component of the particle velocity. In general, the direct event shown in FIG. 4 is manifested as a positive maximum A in the vertical component of the particle velocity followed by a negative minimum B.

FIG. 5 shows the composite traces generated by applying the method of FIG. 3 to the simulated data traces of FIG. 4. That is, FIG. 5 shows the composite traces generated by applying equation (5) with n=m=1 and $a_{k-1}=a_{k-1}=-\frac{1}{2}$ and $a_k=1$ to the simulated traces of FIG. 4. This corresponds to application of a conventional linear trend removal filter.

It will be seen that the effect of applying the linear trend removal filter is to make the arrival time of the direct event substantially independent of offset. The new zero time sample is now at sample 100, just in the middle of the time axis. (In the original data of FIG. 4, the zero time sample corresponds to the time when the source was actuated, but after the convolution process the zero time sits in the middle at sample 100—energy at samples lower than 100 would reflect a time-delay, and energy at higher samples would reflect a time-advance.)

In the composite traces of FIG. 5, the direct event is now manifested as a weaker maximum A' followed, in sequence, by a strong minimum B, a strong maximum A, and a weaker minimum B' in the vertical component of the particle velocity.

Figure 6:
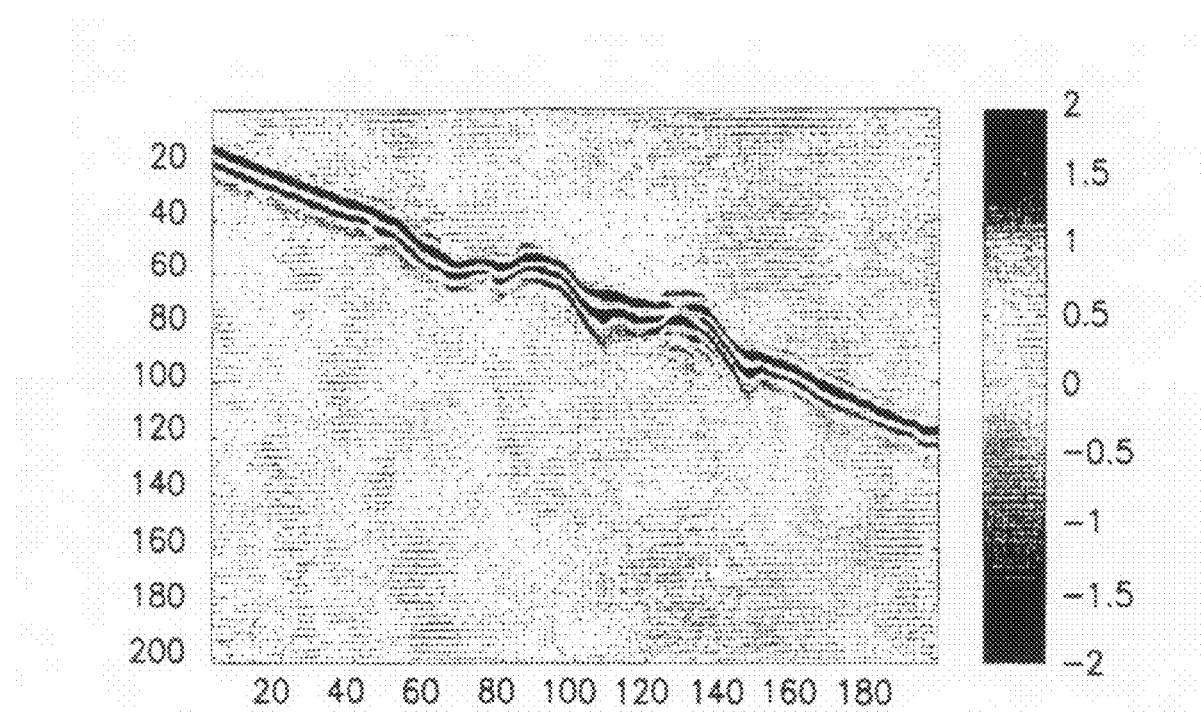
FIG. 6 shows the data traces of FIG. 4 after processing by a second embodiment of the invention.
Figure 7:
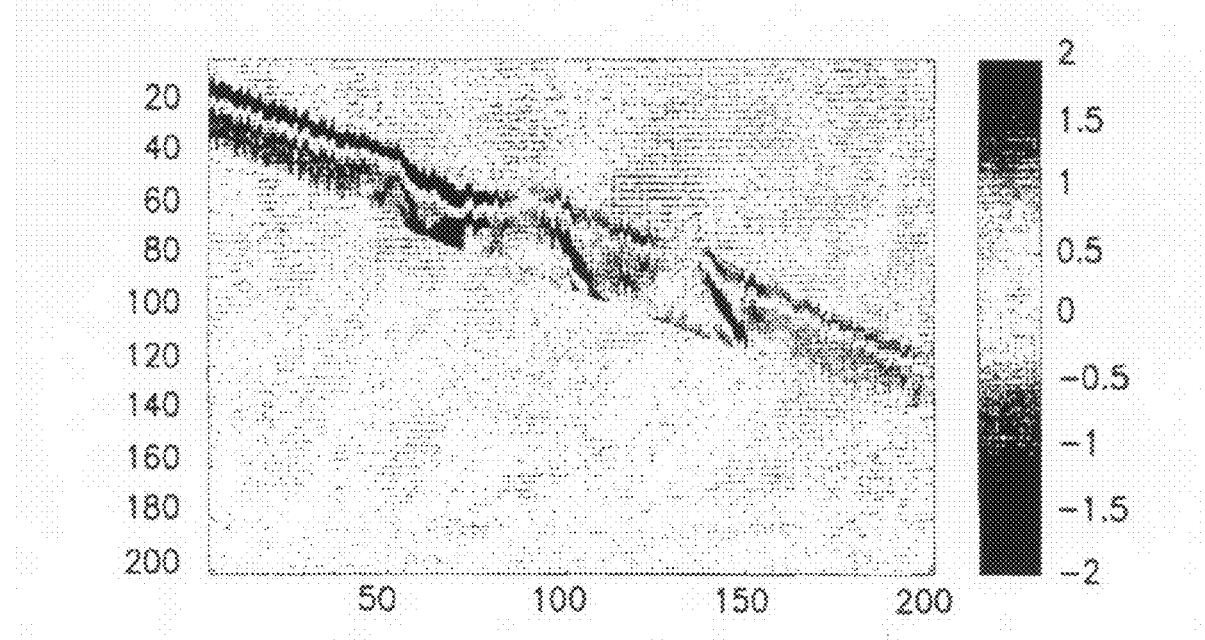
FIG. 7 shows the data traces of FIG. 4 after the addition of random noise.
Figure 8:
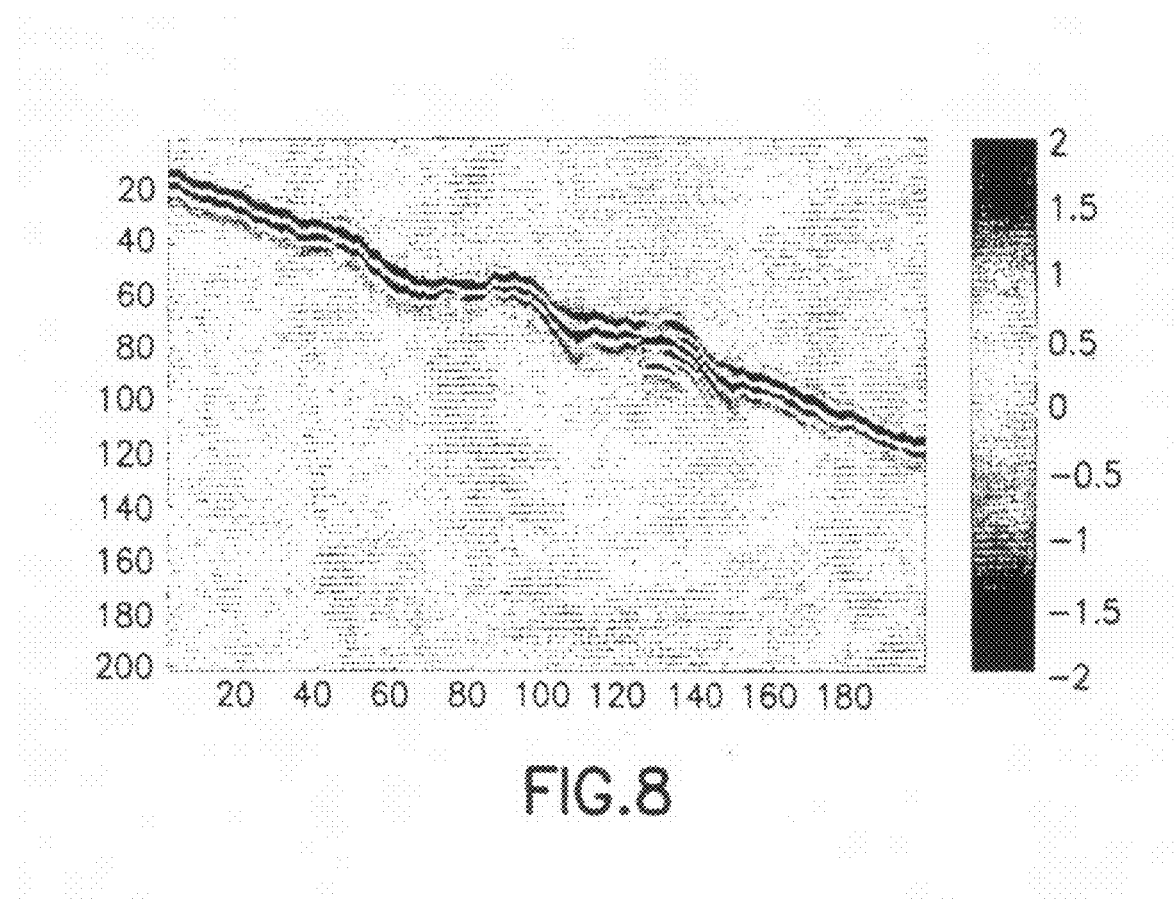
FIG. 8 shows the data traces of FIG. 7 after processing by the second embodiment of the invention.

FIGS. 6 to 8 illustrate another application of the invention. FIG. 6 shows the result of applying, to the simulated data traces of FIG. 4, a five-term smoothing filter that uses two adjacent traces on either side of the subject trace. That is, FIG. 6 shows the composite traces obtained by applying equation (6) to the data traces of FIG. 4, using n=m=2. The filter gives equal weight to each of the traces, so $a_{k-2}=a_{k-1}=a_k=a_{k+1}=a_{k+2}=1$. No other traces are used in the convolution, so the coefficients for the $(k-3)^{rd}$ or lower traces and for the $(k+3)^{rd}$ or higher traces are zero (so $a_{k-3}=a_{k-4}=\ldots=0$, $a_{k+3}=a_{k+4}=\ldots=0$).

In the composite traces of FIG. 6, the direct event is now manifested as a weak maximum A'0 followed, in sequence, by a strong minimum B, a strong maximum A, and a weak minimum B' in the vertical component of the particle velocity.

It will be seen in FIG. 6 that the variation in offset with the arrival time of the direct event is generally smoother in FIG. 6 than in FIG. 4. It will also be seen that the direct event is compressed in time in FIG. 6, compared to FIG. 4, and this is a side effect of performing smoothing by the method of the invention.

FIG. 7 shows simulated data traces that generally correspond to the data traces of FIG. 4 but that contain random noise. The traces of FIG. 7 contain high wavenumber random time jitter, and it will be seen that the arrival time of the direct event is less stable, and is less well-defined, in FIG. 7. In general, the direct event shown in FIG. 7 is, as in FIG. 4, manifested as a positive maximum A in the vertical component of the particle velocity followed by a negative minimum B.

FIG. 8 shows the results of applying the five-term smoothing filter using two adjacent traces on either side of the subject trace. That is, FIG. 8 shows the composite traces obtained by applying equation (6) to the data traces of FIG. 7, using n=m=2. The filter gives equal weight to each of the traces, so $a_{k-2}=a_{k-1}=a_k=a_{k+1}=a_{k+2}=1$. It will be seen that the results of FIG. 8 are very similar to those of FIG. 6, showing that the method of the invention is effective at removing random noise. In the composite traces of FIG. 8, the direct event is again manifested as a weak maximum A' followed, in sequence, by a strong minimum B, a strong maximum A, and a weak minimum B' in the vertical component of the particle velocity.

Figure 9:
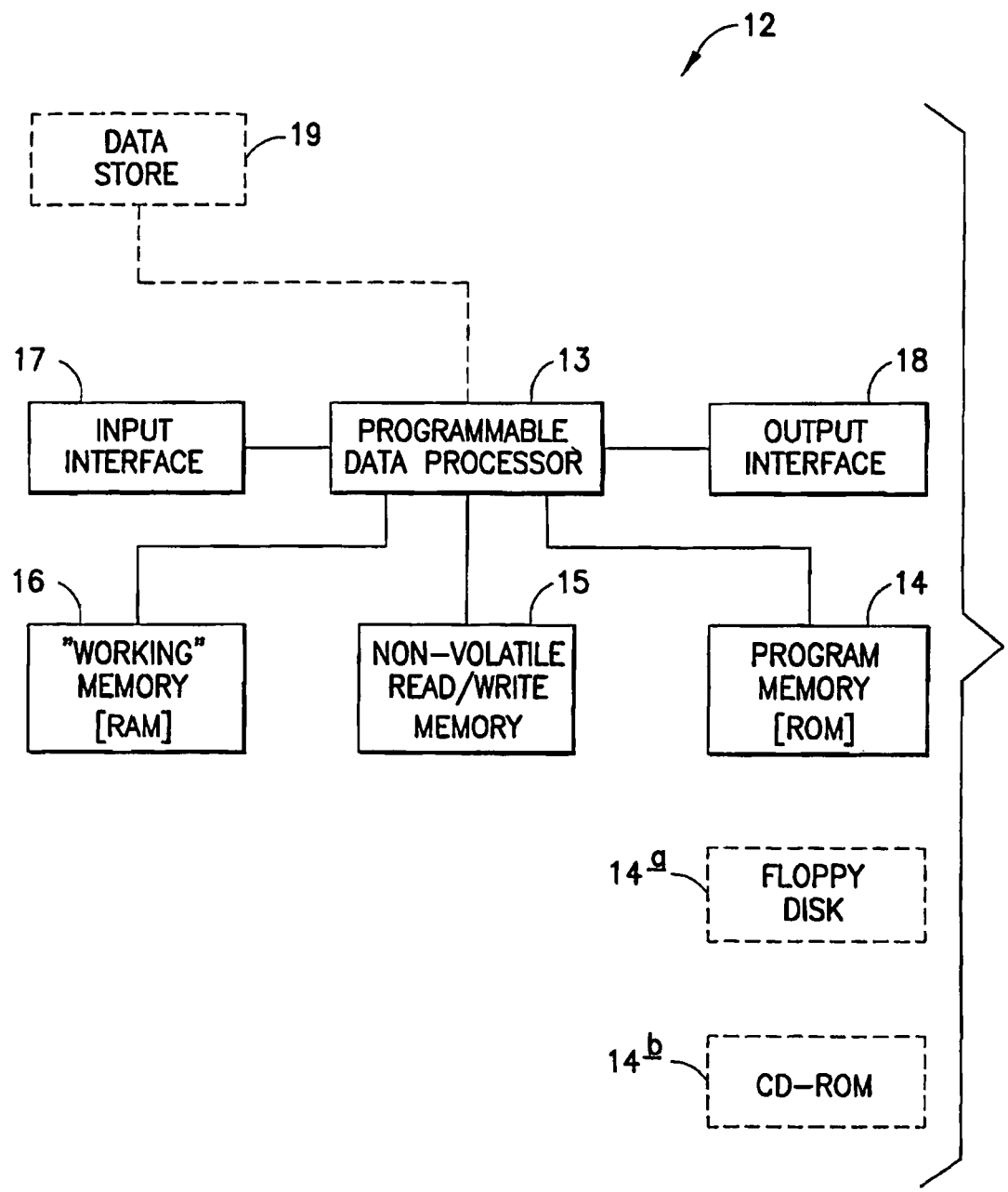
FIG. 9 is a block schematic diagram of an apparatus according to the invention.

FIG. 9 is a schematic block diagram of a programmable apparatus 12 according to the present invention. The apparatus comprises a programmable data processor 13 with a program memory 14, for instance in the form of a read-only memory (ROM), storing a program for controlling the data processor 13 to perform any of the processing methods described above. The apparatus further comprises non-volatile read/write memory 15 for storing, for example, any data which must be retained in the absence of power supply. A "working" or scratch pad memory for the data processor is provided by a random access memory (RAM) 16. An input interface 17 is provided, for instance for receiving commands and data. An output interface 18 is provided, for instance for displaying information relating to the progress and result of the method. Data for processing may be supplied via the input interface 17, or may alternatively be retrieved from a machine-readable data store 19.

The programme for operating the system and for performing any of the methods described hereinbefore is stored in the program memory 14, which may be embodied as a semiconductor memory, for instance of the well-known ROM type. However, the programme may be stored in any other suitable storage medium, such as magnetic data carrier 14a, such as a "floppy disk" or CD-ROM 14b.

The invention claimed is:

1. A method of processing seismic data comprising:
   receiving from a plurality of seismic receivers a gather of a plurality of seismic data traces, wherein each of the seismic data traces is received from a one of the plurality of seismic receivers;
   using a processor to convolve a composite trace according to a convolution $$X_k'(t) = *_{j=-m}^{n} X_{k+j}(a_j t),$$

wherein $X_k(t)$ denotes the $k^{th}$ trace, n is a natural number, $a_j$ denotes a trace specific weighting constant, * denotes the convolution operation, and $X_k'(t)$ denotes the composite trace, and wherein the composite trace for the $k^{th}$ trace is convolved from at least three or portions of three of the plurality of seismic data traces, the at least three of the seismic data traces comprising the $k^{th}$ trace, a first group of adjacent traces located on a first side of the $k^{th}$ trace, the first group of adjacent traces comprising at least the $k^{th}+1$ trace, and a second group of adjacent traces located on a second side of the $k^{th}$ trace, the second group of adjacent traces comprising at least the $k^{th}-1$ trace; and picking a travel time of an event in the composite trace.

2. A method as claimed as in claim 1, wherein the first group of adjacent traces further comprises the $k^{th}+2$ trace.

3. A method as claimed as in claim 1, wherein the gather of traces comprises a common source gather of traces.

4. A method as claimed in claim 1 wherein the trace specific weighting constant for a selected one of the traces is less than zero.

5. A method as claimed in claim 1 wherein the trace specific weighting constant for a selected one of the traces has a magnitude of less than one.

6. A method as claimed in claim 1 wherein the trace specific weighting constant for a selected one of the traces has a magnitude greater than one.

7. A method as claimed in claim 1, further comprising applying a linear trend removal filter in the convolution, where the linear trend removal filter comprises specifying the trace specific weighting constants as $a_{k-1}=a_{k+1}=-\frac{1}{2}$ and $a_k=1$, wherein $a_k$ is the trace specific weighting constant applied to the $k^{th}$ trace, $a_{k+1}$ is the trace specific weighting constant applied to the $k+1^{th}$ trace and $a_{k-1}$ is the trace specific weighting constant applied to the $k-1^{th}$ trace.

8. A method as claimed in claim 1 further comprising applying a five term smoothing filter in the convolution, where the five term smoothing filter comprises specifying the trace specific weighting constants as $a_{k-2}=a_{k-1}=a_k=a_{k+1}=a_{k+2}=1$, where $a_k$ is the trace specific weighting constant applied to the $k^{th}$ trace, $a_{k+1}$ is the trace specific weighting constant applied to the $k+1^{th}$ trace, $a_{k+1}$ is the trace specific weighting constant applied to the $k+2^{nd}$ trace, $a_{k-1}$ is the trace specific weighting constant applied to the $k-1^{th}$ trace and $a_{k-2}$ is the trace specific weighting constant applied to the $k-2^{nd}$ trace.

9. A method as claimed in claim 1, wherein the convolution is performed in the frequency domain.

\* \* \* \* \*